Patented Nov. 19, 1940

2,221,793

UNITED STATES PATENT OFFICE 2,221,793

METHOD OF PRODUCING PHOTOGRAPHIC DYESTUFF PICTURES

Béla Gáspár, Hollywood, Calif.

No Drawing. Application May 16, 1939, Serial No. 274,035. In Great Britain May 17, 1938

11 Claims. (Cl. 95—6)

The present invention relates to a method of producing photographic dyestuff pictures.

It is already known in the art that the metallic silver deposit of a photographic picture is capable of destroying the dyestuff present in a colored layer positioned immediately adjacent to the image bearing layer when treated with dye destroying solutions of the kind described in Letters Patent No. 2,020,775 dated November 12, 1935.

When performing the dye destruction with the hitherto known treating solutions a relatively long treating time is required which sometimes causes a deficiency in the pictures, possibly due to the fact that the dyestuff spreads or diffuses during the extended time which the picture must remain in the treating solutions. Apart from the lack of definition of the picture, thus obtained, prolonged treating times are furthermore objectionable in view of the possibility that the gelatine or other binding agent may, to a certain degree, be attacked by the dyestuff destroying solutions. Accordingly, attempts have been made to improve the process by shortening the time of treatment. It has been found that it is not always possible to raise the temperature of the treating solutions and thereby to decrease the duration of the process. It has been found, however, that the appearance of the pictures can be improved to a remarkable degree by the use of special dye destroying solutions which act in a much shorter time than those used heretofore in the process.

According to the present invention photographic pictures which comprise a developed silver image in a layer positioned immediately adjacent to a colloid layer containing a dyestuff which is resistant to the ordinary photographic treating solutions, but which can be locally destroyed under the influence of a metallic silver image, are treated with dyestuff destroying solutions which are capable of destroying such a dyestuff under the influence of the metallic silver and which in addition contain a substance which accelerates the reaction between the silver and the dyestuff.

Typical examples of solutions which are capable of destroying the dyestuff under the influence of a metallic silver picture and which in the absence of silver do not attack the dyestuff are as follows: solutions of thiocarbamide or of hydrohalic acids, acid solutions of guanidine or its derivatives, etc. These treating solutions are, according to the invention, employed with the addition of accelerating substances.

The accelerating substances may be of various types, but the best results have been obtained by the use of reducible compounds and more particularly such compounds which are easily reducible to substances which are capable of being easily reoxidized in the same solution. Typical examples of such compounds are dyestuffs, such as methylene blue or other dyestuffs of the azine type, including oxazine dyes, thiazine dyes, saffranine dyes, diphenyl- and triphenylmethane dyes, anthraquinone dyes. The property of accelerating the reaction between the silver and the dyestuff in the dye destroying agents enumerated above is, however, not only to be found in the case of colored accelerators, but uncolored compounds are also very suitable accelerators. As examples, the following are illustrative of uncolored compounds: dimethylquinoxaline, diamino-phenazine or other quinoxaline or phenazine derivatives. It has been found that these compounds serve as satisfactory accelerators and when they are substituted in 2,3 positions they are particularly well suited to employ in the reaction. Additional accelerators are disclosed in application Serial No. 179,591, filed December 13, 1937, and United States Letters Patent No. 2,183,395 granted December 12, 1939, to Béla Gáspár. The accelerating effect seems to be a particular property of compounds which are derived from the general formula:

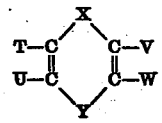

in which X and Y are oxygen, sulphur, nitrogen, carbonyl C=O or methylen $CH_2$. T, U, V, W are hydrogen or sulphonic acid, alkyl aryl, $NH_2$—, OH— or substituted amino or hydroxy groups and instead of T and V and/or V and W cyclic radicals containing these groups may be present. Furthermore, desensitizing dyestuffs or, in some cases, also dyestuffs of sensitizing properties can be used.

In order to show the effect of the new treating solutions the following example may be given.

*Example*

A silver halide gelatine layer and a colored gelatine layer in immediate contact therewith are applied to a support. The colored gelatine layer contains a dyestuff which is resistant to the ordinary treating solutitons but can be locally destroyed under the influence of a metallic silver image, such as a reducible azo dye or another dyestuff which can be destroyed by reduction. Preferably, a water-insoluble dyestuff should be incorporated in the gelatine or a water soluble dyestuff should be precipitated therein by the formation of an insoluble salt. By selecting insoluble dyestuffs or by producing an insoluble salt, the dyestuff is prevented from diffusing to those places which are already decolorized and from hampering thereby the production of a well defined picture. As a yellow dyestuff Chrysophenine G (Schultz Farbstofftabellen, Leipzig 1931, 7th edition, volume 1, No. 726) and as a magenta dyestuff Tuchume 1, No. 726) and as a magenta dyestuff Tuchechtrot 3 B (manufactured by the Society for Chemical Industry in Basle), for example, may be used and precipitated by triphenylguanidine acetate. The light sensitive material is exposed in the usual manner either with the silver halide layer facing the light source or, if the dyestuff present in the gelatine layer is intended to act as a filter dye during the exposure, from the side of the colored gelatine layer. After the development and possibly fixing, the picture is treated with the following solution:

Potassium bromide_____grams__ 11.9
Concentrated sulphuric acid_____ccs__ 27.9
2,3-dimethyl quinoxaline_____grams__ 2.0
Water to_____liter__ 1 for about 10 minutes. The remnant silver is thereafter transformed into a soluble silver salt and dissolved, thus leaving only the dyestuff image in the gelatine layer. If in the formula given above the dimethyl quinoxaline is omitted, dyestuff images of approximately the same appearance are obtainable only by a prolonged treatment. In place of using 2.0 grams of 2,3 dimethyl quinoxaline per liter treating bath in the above composition, good results have been obtained by employing 0.1 to 0.5 gram of a phenazine compound as the accelerating agent. Examples of phenazine compounds which may be used in this manner are 2,3 diamino-phenazine; 2 oxy-3 amino-phenazine; 2 amino-phenazine; aminonaphto - phenazine; (Dibenzo - 1'.2' : 1.2; 1''.2''; 5.6-phenazine)-disulphonic acid (4:4''), (cf. Beilstein Suppl. Vol. No. XXV, page 612).

The treating solution used in the above example can be replaced by other treating baths, such as 11% hydrochloric acid or by 3.5% thiocarbamide solution in each case with the addition of one of the accelerating substances enumerated above. The 3.5% thiocarbamide solution is of the following formula:

Thiocarbamide _____grams__ 3.5
Hydroquinone_____do____ 15
Chromium alum_____do____ 25
Concentrated sulphuric acid_____ccs__ 2.5
2,3-dimethyl quinoxaline_____grams__ 2.0
Water to_____liter__ 1

The invention can be used for the production of multicolor images by the simultaneous production of colored part images in a multilayer film containing several different silver images and at least one colored layer in close contact with a silver image-bearing layer. All of the part images can be produced in colored gelatine layers adjacent respectively to one of the image-bearing layers or some of the image-bearing layers themselves may contain the dyestuff for producing therein the part image. Thus, for example, a panchromatic layer is coated onto a support. A gelatine layer dyed with the dye Tuchechtrot 3 B (Schultz Farbstofftabellen, Leipzig 1932, 7th ed., vol. 2, page 222) is coated over the panchromatic layer. An ortho-chromatic layer dyed with Chlorantinlichtgelb 5 GL (Schultz Farbstofftabellen, Leipzig 1932, 7th ed., vol. 2, page 48) is coated either directly over the red gelatine layer or over an uncolored thin gelatine intermediate layer. The film described is used as the rear film of a bi-pack, the front film of which carries an ordinary blue-sensitive silver halide emulsion layer coated on the support and a gelatine layer dyed with Chrysophenine G is coated over the blue-sensitive layer. The front film and the rear film are exposed with the two yellow emulsion layers in contact. After the exposure, the development and the fixing, the dye is destroyed in the yellow gelatine layer of the front film under the influence of the silver image produced in the blue-sensitive silver halide emulsion layer and the red dye in the rear film is destroyed under the influence of the silver image produced in the panchromatic layer, whereas the yellow dye present in the ortho-chromatic layer is destroyed under the influence of the silver image present in this layer. For the dye destruction, the treating solutions cited above may be used. By the local dye destruction a yellow dye image representing the blue color selection of the photographic object is obtained in the front film of the bi-pack, whereas a two-color-image is obtained in the rear film. The double colored image contains the green color selection in the form of a yellow dye image and the red color selection in the form of a magenta dye image.

I claim:
1. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising a solvent for silver salts and a substance that is rapidly reducible by reducing agents to yield a reduction product that rapidly reduces said reducible dye.

2. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising hydrohalic acid and a substance that is rapidly reducible by reducing agents to yield a reduction product that rapidly reduces said reducible dye.

3. The process of producing photographic dye images which comprises producing a photographic silver image in a silver halide emulsion layer positioned immediately adacent to an inactinic colloid layer uniformly dyed with a reducible dye that is resistant to ordinary photographic treating solutions and treating both layers in a solution comprising thiocarbamide and a substance that is rapidly reducible by reducing agents to yield a reduction product that rapidly reduces said reducible dye.

4. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising a solvent for silver salts and a reducible organic substance capable of being rapidly reduced in said solution selected from the group consisting of unsubstituted and substituted compounds of the following general formula

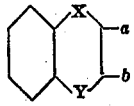

in which X and Y represent a chemical symbol selected from the group of symbols consisting of N, S, O, C=O, C=NH, and in which $a$ and $b$ represent a residue selected from the group consisting of H, and four-membered carbon chains forming a condensed ring system, the substituents being selected from the group of substituents consisting of amino groups, oxy groups, alkyl groups, aryl groups and sulphonic groups.

5. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising hydrohalic acid and a reducible organic substance capable of being rapidly reduced in said solution selected from the group consisting of unsubstituted and substituted compounds of the following general formula

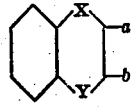

in which X and Y represent a chemical symbol, selected from the group of symbols consisting of N, S, O, C=O, C=NH, and in which $a$ and $b$ represent a residue selected from the group consisting of H, and four-membered carbon chains forming a condensed ring system, the substituents being selected from the group of substituents consisting of amino groups, oxy groups, alkyl groups, aryl groups and sulphonic groups.

6. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising thiocarbamide and a reducible organic substance capable of being rapidly reduced in said solution selected from the group consisting of unsubstituted and substituted compounds of the following general formula

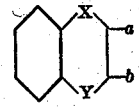

in which X and Y represent a chemical symbol, selected from the group of symbols consisting of N, S, O, C=O, C=NH, and in which $a$ and $b$ represent a residue selected from the group consisting of H, and four-membered carbon chains forming a condensed ring system, the substituents being selected from the group of substituents consisting of amino groups, oxy groups, alkyl groups, aryl groups and sulphonic groups.

7. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising a solvent for silver salts and a phenazine compound.

8. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising a solvent for silver salts and a quinoxaline compound.

9. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising thiocarbamide and a phenazine compound.

10. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising hydrohalic acid and a quinoxaline compound.

11. The process of producing photographic dye images which comprises producing a photographic silver image in a silver halide emulsion layer positioned immediately adjacent to an inactinic colloid layer uniformly dyed with a reducible dye that is resistant to ordinary photographic treating solutions and treating both layers in a solution comprising thiocarbamide and a quinoxaline compound.

BÉLA GÁSPÁR.